June 11, 1929.  J. A. BAYET  1,717,304

DRILLING DEVICE FOR THE MANUFACTURE OF GLASS BOTTLE NECKS

Filed Nov. 2, 1926

INVENTOR
J. A. Bayet
by Langner, Parry, Card & Langner
Att'ys.

Patented June 11, 1929.

1,717,304

UNITED STATES PATENT OFFICE.

JULES ALEXIS BAYET, OF NANCY, FRANCE, ASSIGNOR TO SOCIÉTÉ ANONYME DES CRISTALLERIES DE NANCY, OF NANCY, FRANCE.

DRILLING DEVICE FOR THE MANUFACTURE OF GLASS-BOTTLE NECKS.

Application filed November 2, 1926, Serial No. 145,885, and in France August 20, 1926.

Since the necks of bottles have an irregular shape after their manufacture, emery-ground stoppers can only be employed after boring out the bottle neck in such manner as to give it the diameter and the taper corresponding to the stopper.

In the known methods, the bottle necks are bored or drilled by means of a tapered sheet metal tube and an abrasive substance, or by a drill point into which diamonds are inserted.

The first of these means will lead to the manufacture of irregular tapered parts, for the sheet metal tube is soon put out of shape, and since the work is performed by hand, its quality will depend upon the skill of the workman.

In the second case, mechanical means are employed, but the result is a rough and rugous bore which must be then made smooth by the use of the first-mentioned means. Further, this will lead to the breakage of a great number of bottles, since the method is too heavy for use with a fragile substance such as glass.

It is to be noted that there are employed in the industries certain tools such as drill points which are covered with diamond dust by pressure, these being utilized by lapidaries, but such tools cannot be used in their present state for the boring of bottle necks, for they will not provide for the immediate discharge of the glass which is removed by the tool, and this discharge is an essential feature, for otherwise the particles of glass would adhere to the tool and would cause the rapid wear of the latter and a frequent breakage of the bottle neck.

Figure 1:
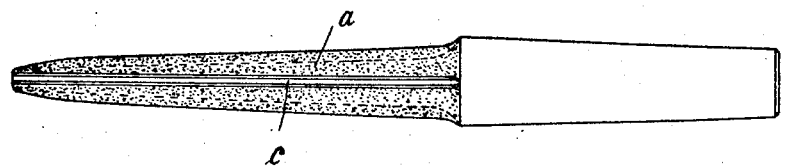
Figure 2:
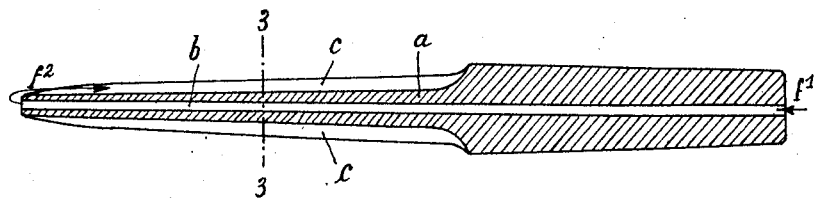
Figure 3:
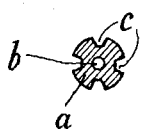

The present invention relates to a method for boring out the necks of glass bottles by means of the last-mentioned drill-points which are suitably modified, so as to provide for the immediate washing out of the bored portion by a water circulation either in the interior or at the exterior of the drill point, or both internally and externally. For this purpose, the drill point $a$, as shown by way of example in the appended drawing, in the external view, Fig 1, in lengthwise section Fig. 2, and in cross section on the line 3—3 of Fig. 2 in Fig. 3, comprises the axial conduit $b$, and the longitudinal grooves $c$ formed at the exterior. The said drill point or boring piece is covered by pressure with diamond dust in the known manner, and is mounted upon a drilling machine which is provided with a hollow shaft through which water under pressure can be supplied. The water passes through the axial conduit $f$ in the direction of the arrow $f^1$, then enters the bottle, and passes out through the external slots $c$, carrying with it the material which has been removed by the boring.

The water which thus circulates during the drilling or boring operation will provide for a continuous washing of the bored part, and for the rapid discharge of the material removed from the bottle neck.

I may obviously employ various dispositions for the water circulation, and further, the said slots may be otherwise arranged, and may for instance have the helicoidal form.

What I claim is:

1. A drill point whose surface is covered with adherent diamond dust, and which is provided with an axial conduit and with external grooves.

2. A drill point whose surface is covered with an adherent abrasive substance and which is provided with an axial conduit and with external grooves adapted for carrying out the glass particles removed by the said abrasive substance.

3. A drill point whose surface is covered with an adherent abrasive substance and which is provided with an axial conduit and with longitudinal external grooves adapted for carrying out the glass particles removed by the said abrasive substance.

4. A drill point whose surface is covered with adherent diamond dust and which is provided with an axial conduit and with longitudinal external grooves adapted for circulating a liquid whereby glass particles which fall in the grooves are washed out.

In testimony whereof I have signed this specification.

JULES ALEXIS BAYET.